A. J. RODRIGUE.
HAY PRESS.
APPLICATION FILED JULY 3, 1915.

1,221,220.

Patented Apr. 3, 1917.
4 SHEETS—SHEET 1.

Witnesses:

Inventor,
A. J. Rodrigue.
By
Attorney

A. J. RODRIGUE.
HAY PRESS.
APPLICATION FILED JULY 3, 1915.
1,221,220.
Patented Apr. 3, 1917.
4 SHEETS—SHEET 2.
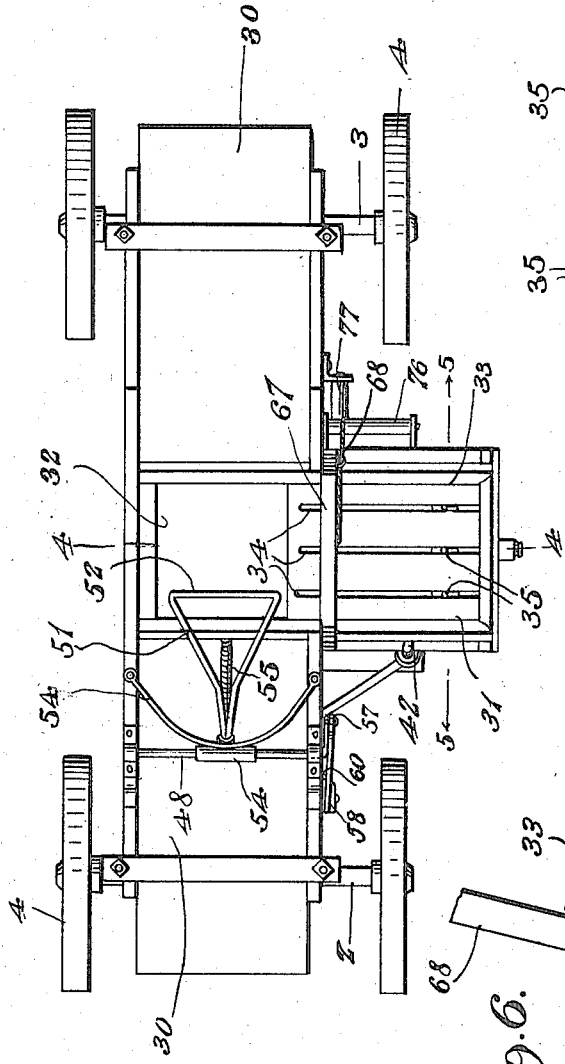
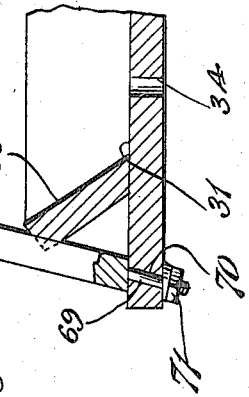
Witnesses.
Inventor,
A. J. Rodrigue
By
Attorney

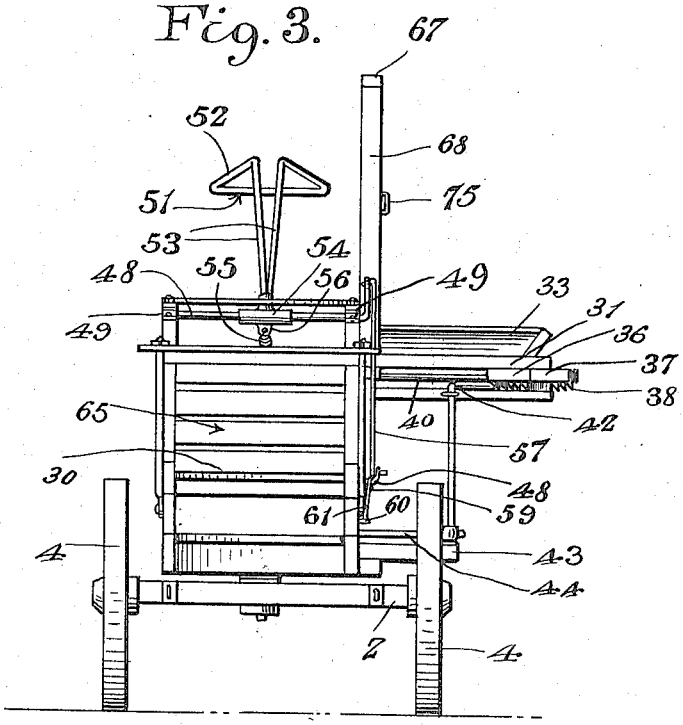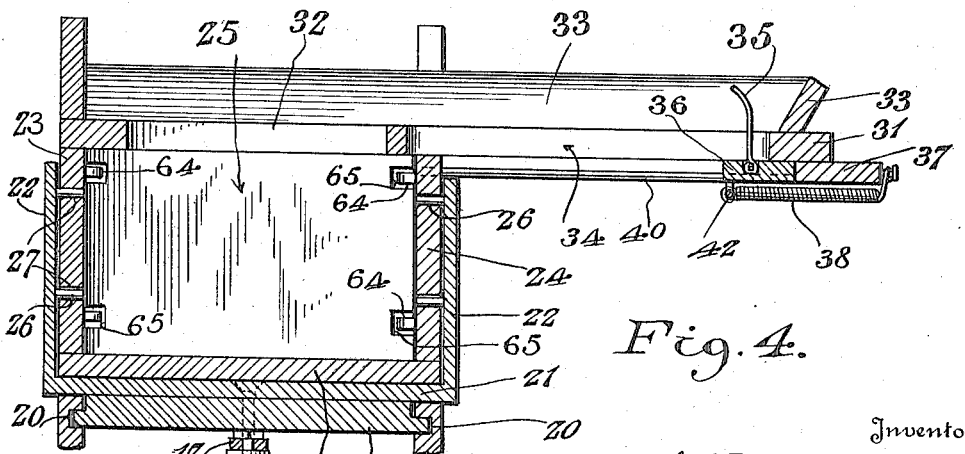

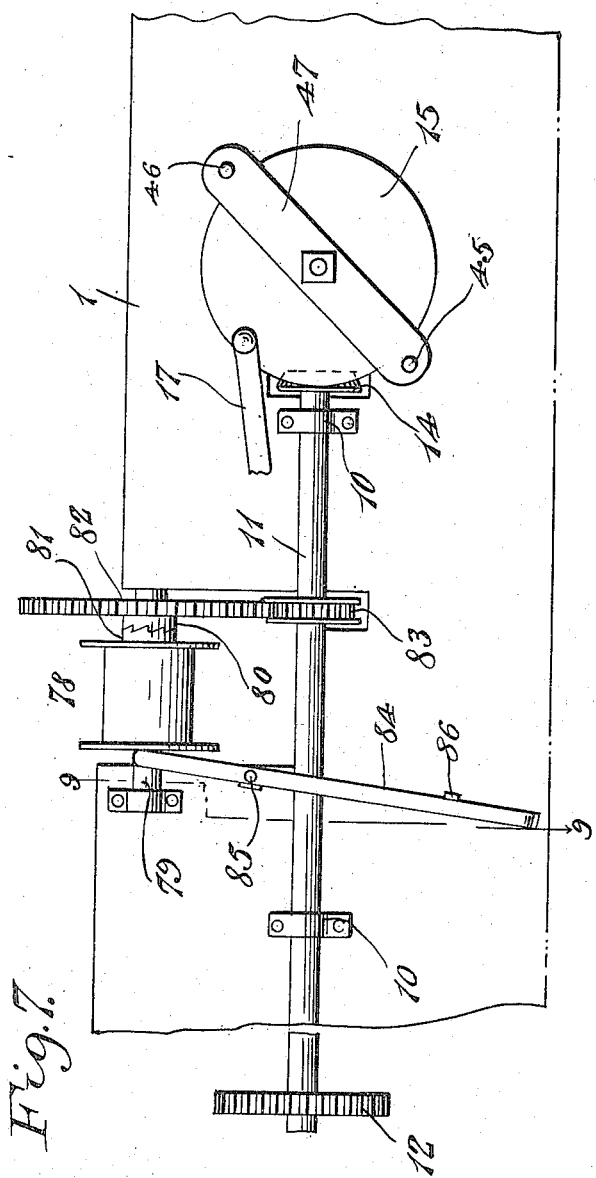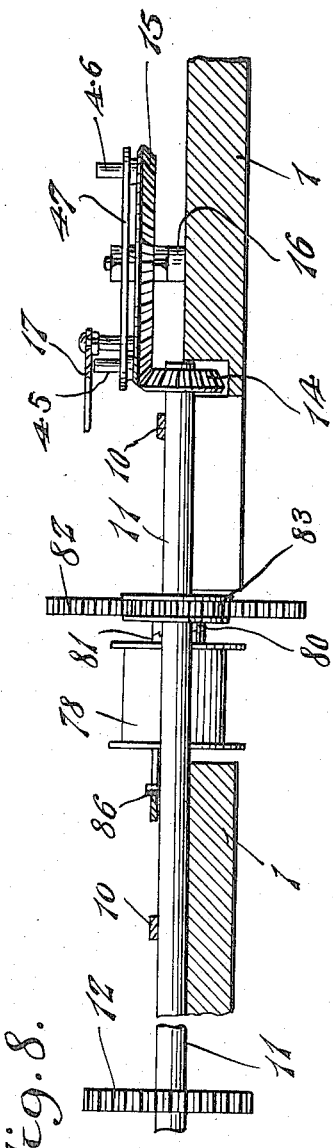

UNITED STATES PATENT OFFICE.

ANTONE J. RODRIGUE, OF PRINCETON, CALIFORNIA.

HAY-PRESS.

1,221,220.  Specification of Letters Patent.  Patented Apr. 3, 1917.

Application filed July 3, 1915. Serial No. 37,863.

*To all whom it may concern:*

Be it known that I, ANTONE J. RODRIGUE, a citizen of the United States, residing at Princeton, in the county of Colusa and State of California, have invented certain new and useful Improvements in Hay-Presses; and I do hereby declare the following to be a full, clear, and exact description of the invention, such as will enable others skilled in the art to which it appertains to make and use the same.

This invention relates to hay presses, for compressing hay for baling, and the primary object of the invention is to provide a hay press or baler as specified, wherein the baling plunger or compressing head acts for compressing the hay upon each stroke of the same, forming a double action press.

Another object of this invention is to provide means for automatically feeding the hay to the baling chamber, at predetermined times, and a tamping arm which is automatically operated immediately after the feeding of the hay into the baling chamber, for tamping the hay therein.

Another object of this invention is to provide a derrick structure, which is operable by the mechanism for operating the compressing head, feeder and tamping arm, for carrying bundles of hay upwardly for deposit upon the hay receiving platform, prior to the feeding of the hay into the baling chamber, thereby eliminating the manual labor necessary for pitching the hay upon the hay receiving table.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Fig. 2 is a top plan view of the baler,

Fig. 3 is an end view of the baler,

Fig. 4 is a cross sectional view on the line 4—4 of Fig. 2,

Fig. 5 is a sectional view on the line 5—5 of Fig. 2,

Figure 9:
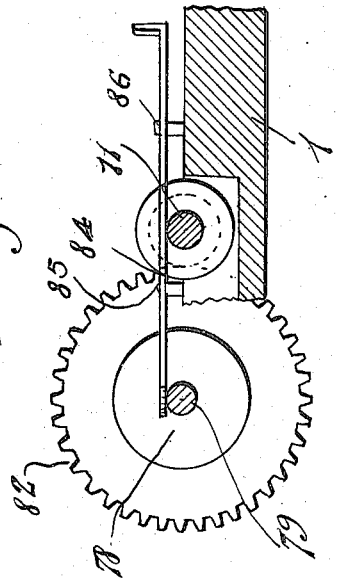
Figure 10:
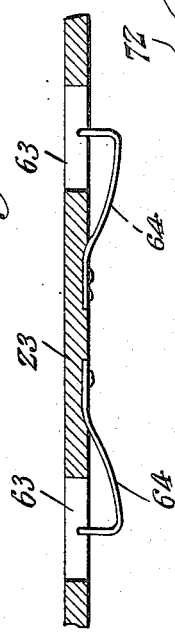

Fig. 6 is a fragmentary sectional view of a part of the feeding table, showing the manner of connecting the derrick supporting structure thereto, Fig. 7 is a plan view of the operating mechanism for the baler, Fig. 8 is a side elevation of Fig. 7, showing parts in section, Fig. 9 is a sectional view on the line 9—9 of Fig. 7, and Fig. 10 is a fragmentary horizontal section through one side of the baling chamber.

Referring more particularly to the drawings, 1 designates the supporting base or platform of the baler structure, which is mounted upon axles 2 and 3, which have supporting wheels 4 mounted thereon, for portably supporting the baler.

The base 1 has standards 5 and 6 secured to the upper surfaces of its ends, which support the baling chamber and the structure for baling the hay.

The platform 1 has bearings 10 carried thereby, which rotatably support the drive shaft 11 of the baler. The drive shaft 11 has a power transmitting wheel 12 mounted upon one end thereof which may be operatively connected to any suitable type of prime mover or propelling mechanism. A beveled gear 14 is mounted upon the end of the power shaft 11 opposite to the transmitting gear or pulley 12, and it meshes with a beveled gear 15. The beveled gear 15 is rotatably carried by a vertical stub shaft 16, and it rotates in a horizontal plane.

A pitman 17 is eccentrically connected to the beveled gear 15, and it is connected to a bolt 18. The bolt 18 is carried by a cross head 19, which travels in guideways 20. The cross head 19 has a substantially U-shaped member 21 secured thereto, a side 22 of which engages the outer surfaces of the sides 23 and 24 of the baling or compressing chamber. The sides 22 of the U-shaped member 21 have a compressing head 25 secured thereto by means of pins or analogous structures 26. The pins 26 extend through slots 27, which are formed in the sides 23 and 24, which guide the movement of the head 25. The base of the U-shaped member 21, is positioned beneath the bottom 28 of the baling chamber, while the head 25 travels across the upper surface of the bottom 28, as is clearly shown in Fig. 4 of the drawings.

Figure 1:
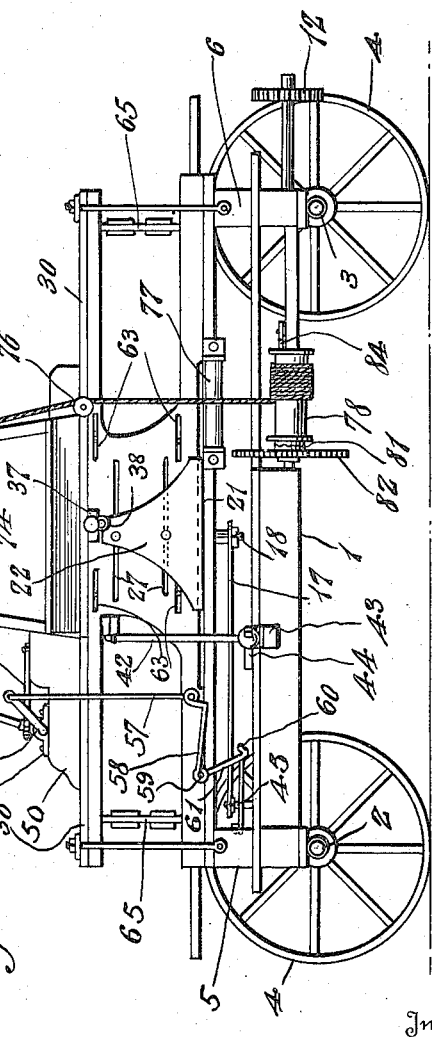
Figure 1 is a side elevation of the improved hay baler.

The sides 23 and 24 of the baling chamber are cut away, as is clearly shown in Fig. 1 of the drawings, to permit of the tying of a bale of hay, and they have a top board 30 secured to their upper edges.

A feeding table 31 is secured to and extends transversely from the side 24 of the baling chamber, and it is positioned in alinement with the mouth 32 of the chamber. The feeding table 31 has upstanding guard sides 33 secured to the sides and ends of the same for preventing the hay from falling off the table, after it has been deposited thereon. The table 31 is provided with a plurality of longitudinally extending slots 34, through which the feeding fingers 35 project. The feeding fingers 35 are carried by a slidably supported plate 36, which is slidably mounted beneath the under surface of the table 1. A stop block 37 is secured to the under surface of the outer end of the feed table 31 and limits the outward movement of the plate 36. A contracting spiral spring 38 has one end secured to the plate 36 and the other end to the rear edge of the stop block 37, and it tends to automatically return the plate 36 and the feeding fingers 35, to the rear end of the table, after it has been moved forwardly by the mechanism, which will be hereinafter more fully described. The plate 36 is provided with guideways 39 formed in the under surface of the same, which receives guide bars 40. The guide bars 40 extend from the stop block 37, to the side 24 of the baler, and guide the sliding movement of the plate 36.

The plate 36 has an arm 42 connected thereto, which arm extends outwardly and downwardly along the outer side of the baling chamber and has its lower end rotatably mounted in a bearing 43, carried by the base 1. A finger 44 is secured to the bar 42, near its lower end, and it is positioned in the path of upstanding pins 45 and 46. The pins 45 and 46 are carried by an arm 47, which is secured to the beveled gear 15, for rotation synchronously therewith. During the rotation of the beveled gear 15, the pins 45 and 46 will strike the finger 44, at different times, and rock the rod 42, and force the plate 36 forwardly or toward the baling chamber, moving the feeding chamber 35 with the same and carrying the hay, which has been deposited upon the upper surface of the table, forwardly for deposit into the baling chamber through the mouth 32 of the same.

A crank shaft 48 is rotatably carried by bearings 49, which are supported by pillow blocks 50. The pillow blocks 50 are mounted upon the upper surface of the top plate 30. The shaft 48 has a tamping arm 51 connected thereto, which arm is formed of a rod, which is bent intermediate of its ends to form a substantially horizontally positioned portion 52, which is substantially V-shaped in plan, forming a straight length for engaging the hay and tamping it within the baling chamber. The ends of the rod are positioned in a substantially vertical plane, as is shown at 53, and are connected to a collar 54, which encompasses the crank shaft 48. A contracting spiral spring 55 is connected to an ear 56, which depends from the collar 54, and to the top 30 of the baling frame. The spring 55 acts to automatically move the tamping arm out of a tamping position, after it has been forced therein. The crank shaft 48 has a rod 57 connected to the end of the crank portion thereof. The rod 57 extends downwardly and is connected to a bell crank 58. The bell crank 58 is pivotally mounted, as is shown at 59, to the frame of the baling chamber, and it has an angularly disposed finger 60 formed upon the lower end of the downwardly extending arm 61 of the same. The finger 60 is positioned in the path of the pins 45 and 46, a short distance rearwardly of the position of the finger 44, so that after the feeding fingers 35 move forwardly, for feeding the hay into the baling chamber, the crank shaft 48 will be rocked for forcing the straight section of the head 52 of the tamping arm 53, downwardly through the mouth of the baling chamber for tamping the hay in the latter.

The usual type of dividing boards or heads 65 are employed, against which the hay is compressed for forming a bale.

The sides 23 and 24 of the baling chamber, are provided with openings 63, through which the bale tying wires are inserted before the bale has been formed. Resilient or spring arms 64 are secured to the inner surfaces of the sides of the baling chamber, and form guides for guiding the tying wires and holding them in proper position above a bale being formed. The head 25 is provided with recesses 65 which receive the resilient arms during the sliding movement of the head.

The table 31 has a derrick supporting frame 67 detachably connected thereto. The legs or standards 68 of the derrick frame 67 have bolts 69 formed upon their lower ends which extend through openings 70 formed in the sides of the table 31. Nuts 71 are mounted upon the ends of the bolts 69 for detachably connecting the standard or derrick frame 67 to the table 31. The frame 67 has a pulley 72 rotatably carried by the upper end of the same, over which a rope or analogous flexible member 73 passes. The rope or cable 73 has the ordinary type of hay fork 74 secured to one end of the same, and it extends downwardly through the guiding eye 75, and over guiding rollers 76 and 77 to a drum 78 about which it is wound. The drum 78 is slidably mounted upon a shaft 79, and it has a clutch section 81 formed upon one end of the same which is provided for co-action with a clutch section 80 which is formed upon one side of a gear 82. The gear 82 is rotatably mounted upon the shaft 79 and it meshes with a gear 83, which is carried by the power shaft 11. A lever 84, which is pivotally supported at 85 upon the base 1, has one of its ends engaging the drum 78, for shifting the drum upon the shaft 79 upon pivotal movement of the lever, for moving the clutch section 81 into or out of clutching engagement with the clutch section 80. A stop 86 is carried by the base or platform 1 for limiting the movement of the lever 84. When the lever 84 is oscillated for moving the clutch section 81 into engagement with the clutch section 80, the drum 78 will be rotated by the rotation of the power or drive shaft 11, for winding the cable thereon, for raising a bunch of hay which has been gathered or engaged by the hay fork 74, for lifting the same for deposit upon the table 31.

A rod 54' is secured to the pillow block 50 and curved rearwardly of the tamping arm or member 51, for limiting the rearward movement of the same.

In the operation of the improved hay baler; the fork 74 is moved, by manual power, to a position for receiving a bunch of hay, after which the lever 84 is operated for rotating the drum 78 by the rotation of the power shaft 11. The rotation of the drum will wind the rope or cable 73 thereon and hoist or raise the bunch of hay carried by the fork 74 to a position above the table 31, where the fork is tripped. The tripping of the fork will deposit the hay upon the table 31, where it will be engaged by the fingers 35, when the finger 44 is engaged by either one of the upstanding pins 45 or 46. The engagement between the pins 45 or 46 and the finger 44 will rotate the rod 42 and move the feeding fingers 35 forwardly, carrying the hay therewith and depositing it through the mouth 32 into the baling chamber of the baler. The pitman 17 will move the compressing head or plunger 25 forwardly and rearwardly above the bottom plate 28 of the baling chamber and compress the hay against the dividing board 65. Immediately after the hay has been deposited into the baling chamber, by the forward movement of the fingers 35, the pin 45 or 46 will pass beyond the finger 44 and engage the finger 60. The engagement with the finger 60 of either of the pins 45 or 46 will rock the bell crank 58, and consequently the crank shaft 48, forcing the tamping or packing arm 51 downwardly through the mouth of the chamber and tamping the hay within the chamber, prior to the compression of the same by the movement of the head 25.

By providing the two pins 45 and 46, which are positioned diametrically opposite each other and equi-distant of the central axis of the beveled gear 15, the foregoing operation will be repeated prior to each forward and rearward movement of the compressing head or plunger 25, which will form a double acting baler and cause the head or plunger 25 to compress the hay into bales upon each stroke of the same, making two bales in practically the same time and with the same amount of power as is employed for forming a single bale in balers of the common type now in use.

From the foregoing description taken in connection with the accompanying drawings the advantages of construction and of the method of operation of the improved hay press will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a hay baler, the combination, of a baling chamber, a prime mover, a reciprocatory compressing head mounted in said chamber, a cross head connected to said compressing head, a pitman rod connected to said cross head, a beveled gear operatively connected to said prime mover, said pitman being eccentrically connected to said gear for reciprocating said head upon rotation of said gear, a feed table secured to said baling chamber, a plurality of feeding fingers carried by said table, a rod operatively connected to said feeding fingers, a finger carried by said rod, a plurality of upstanding pins carried by said beveled gear for engaging said finger for moving said feeding fingers forwardly toward said baling chamber for feeding hay into the chamber upon each side of said compressing head for compressing the hay upon each stroke of the head.

2. In a hay baler, the combination, of a baling chamber, a prime mover, a reciprocatory compressing head mounted in said chamber, a cross head connected to said compressing head, a pitman rod connected to said cross head, a beveled gear operatively connected to said prime mover, said pitman being eccentrically connected to said gear for reciprocating said head upon rotation of said gear, a feed table secured to said baling chamber, a plurality of feeding fingers carried by said table, a rod operatively connected to said feeding fingers, a finger carried by said rod, a plurality of upstanding pins carried by said beveled gear for engaging said finger for moving said feeding fingers forwardly toward said baling chamber for feeding hay into the chamber upon each side of said compressing head for compressing the hay upon each stroke of the head, a tamping arm, means operatively connected to said tamping arm for engagement with said upstanding pins for tamping the hay within said baling chamber prior to the compression of the hay by said compressing head.

3. In a hay baler, the combination, of a baling chamber, a prime mover, a bevel gear operatively connected to said prime mover, a feed table secured to said baling chamber, a plurality of feeding fingers carried by said table, a rod operatively connected to said feeding fingers, a finger carried by said rod, a plurality of upstanding pins carried by said bevel gear for engaging said finger for moving said feeding fingers forwardly toward said baling chamber for feeding hay into the chamber.

4. In a hay baler, the combination, of a baling chamber, a prime mover, a bevel gear operatively connected to said prime mover, a feed table secured to said baling chamber, a plurality of feeding fingers carried by said table, a rod operatively connected to said feeding fingers, a finger carried by said rod, a plurality of upstanding pins carried by said bevel gear for engaging said finger for moving said feeding fingers forwardly toward said baling chamber for feeding hay into the chamber, a tamping arm, means operatively connected to said tamping arm for engagement with said upstanding pins for tamping hay within said baling chamber.

In testimony whereof I affix my signature in presence of two witnesses.

ANTONE J. RODRIGUE.

Witnesses:
F. M. PORTER,
ERNEST V. EIBE.

Copies of this patent may be obtained for five cents each, by addressing the "Commissioner of Patents, Washington, D. C."